United States Patent [19]

Davis

[11] Patent Number: 5,943,316
[45] Date of Patent: Aug. 24, 1999

[54] CREDIT BANDWIDTH ALLOCATOR FOR A RADIO SYSTEM

[75] Inventor: Simon Paul Davis, Romsey, United Kingdom

[73] Assignee: Roke Manor Research Limited, United Kingdom

[21] Appl. No.: 08/765,693

[22] PCT Filed: May 1, 1996

[86] PCT No.: PCT/GB96/01045

§ 371 Date: Apr. 3, 1997

§ 102(e) Date: Apr. 3, 1997

[87] PCT Pub. No.: WO96/37081

PCT Pub. Date: Nov. 21, 1996

[30] Foreign Application Priority Data

May 17, 1995 [GB] United Kingdom .................. 9509921

[51] Int. Cl.⁶ ......................................... H04Q 7/20
[52] U.S. Cl. ..................... 370/232; 370/329; 370/468
[58] Field of Search .................................. 370/229–236, 370/329, 437, 465, 468

[56] References Cited

U.S. PATENT DOCUMENTS

| | | | |
|---|---|---|---|
| 5,515,359 | 5/1996 | Zheng | 370/231 |
| 5,546,377 | 8/1996 | Ozveren | 370/253 |
| 5,675,576 | 10/1997 | Kalampoukas et al. | 370/232 |
| 5,699,519 | 12/1997 | Shiobara | 370/235 |
| 5,734,825 | 3/1998 | Lauch et al. | 395/200.63 |

FOREIGN PATENT DOCUMENTS

| | | |
|---|---|---|
| 0 432 315 | 6/1991 | European Pat. Off. . |
| 0498967A1 | 8/1992 | European Pat. Off. . |
| 0 601 653 | 6/1994 | European Pat. Off. . |
| 0615393A1 | 9/1994 | European Pat. Off. . |
| 2176973 | 1/1987 | United Kingdom . |
| 92 01345 | 1/1992 | WIPO . |

OTHER PUBLICATIONS

IBM Technical Disclosure Bulletin vol. 24, No. 4; pp. 2044–2046, Sep. 1981.

*Primary Examiner*—Jason Chan
*Assistant Examiner*—Jasper Kwoh
*Attorney, Agent, or Firm*—Evenson, McKeown, Edwards & Lenahan, P.L.L.C.

[57] ABSTRACT

A credit bandwidth allocator system for allocating portions of an available effective communication bandwidth among a plurality of radio connections in a radio system has a credit counter for counting a number of data units received by a radio connection associated therewith, one credit counter means being associated with each radio connection, and a store for data appertaining to such radio connections. A timer provides clock signals of a pre-determined duration, and a central controller, responsive to data in the store and to the clock signals, determines a temporal measure of relative performance for said radio connections dependent upon the count state of the credit counters and the pre-determined duration of the clock signals. The available effective bandwidth is allocated between the said radio connections based on such relative performance.

12 Claims, 6 Drawing Sheets

CREDIT BANDWIDTH ALLOCATOR FOR A RADIO SYSTEM

BACKGROUND OF THE INVENTION

The present invention relates to radio systems, and in particular to the allocation of bandwidth within a radio system. More especially but not exclusively it relates to cellular mobile radio systems.

Cellular mobile radio systems include means for optimising the number of communications channels or connections which can be supported within an allocated radio spectrum. This is achieved in Time Division Multiple Access (TDMA) systems by dividing the two orthogonal dimensions of time and frequency, to give a discrete number of communication channels. This allows a number of mobiles to access a given segment of radio frequency spectrum contemporaneously.

With Code Division Multiple Access (CDMA) systems, communication is effected by means of three orthogonal dimensions, which are time, frequency and code. Unlike TDMA systems which only use the dimensions of time and frequency, CDMA systems offer a third orthogonal dimension, that of code. Each mobile is allocated a separate code which is used in transmission to modulate a data signal, thereby spreading the bandwidth of a subsequently transmitted radio signal within a shared radio spectrum. At a base station a receiver de-spreads the received radio signal using this known code, to recover a mobile's data. All other coded signals appear as noise. However, as the number of mobiles in a CDMA system increases, the noise level which is present when de-spreading a desired signal increases. This, by its nature, increases the symbol error rate in the integrity of the received data; an effect which is experienced by all mobiles. Thus in CDMA systems there is not a hard capacity limit as there is in TDMA systems, but a soft limit, derived from an acceptable symbol error rate which a mobile user can endure. Nevertheless, for a predetermined bandwidth and an acceptable symbol error rate, there is an upper limit in the capacity of a CDMA system as determined by the three dimensions of time, frequency and a predetermined number of codes which are shared between all mobiles. For TDMA systems, an upper limit in the capacity of a system is fixed by the number of frequency channels and the number of time slots those channels are divided into.

In the following description we define effective bandwidth to mean a collection of quantitative parameters that determine an information bearing capacity or resource of that system. Thus for a CDMA cellular radio system effective bandwidth would mean an aggregate of the information bearing resources of the system, taking account of a pre-determined number of codes, number of carrier frequencies, and number of time slots of that system. The total effective system bandwidth is therefore a total of all of these quantitative parameters which are available for the support of data services.

In the future, radio communications systems will be expected to support a range of different services such as voice, video and various types of data services. Some services are rather 'bursty' in nature in that they are characterised as having a high peak to mean data rate ratio. This results in there being periods of high activity followed by periods of low or zero activity during a call.

The radio spectrum is a precious resource. One way of ensuring optimum use of an available effective bandwidth resource is, where possible, to take advantage of the 'bursty' nature of a mobile's data source so that bandwidth resource is only occupied when the source is active, or in other words, when it has data to send. In this way, instead of an available bandwidth resource being occupied or allocated on a basis of a peak data rate predicted for a mobile's data source, this bandwidth is occupied or allocated on a basis which is closer to the mean data rate of a mobile's data source. This provides for a greater utilisation of the available effective bandwidth resources.

In a mobile radio system, data is usually transported between a transmitter and a receiver in quantised units. This is a feature which is embodied in the structure of the transport chain of a radio system. Since data is transported in data units of a known and predetermined size, an effective throughput of a radio connection can be determined from a number of data units transported in a pre-determined time interval.

Typically data connections can accept delays of hundreds of milliseconds or more. Delay occurs when a combined total data rate as demanded by all active data connections exceeds a data rate which can be supported by a radio system, as determined by an available bandwidth resource. In this case, a resource allocation scheme is required to fairly allocate an effective bandwidth resource to the mobiles of a radio system, so as to optimise fairly the throughput of a mobile's data source, whilst minimising delay suffered by that source.

SUMMARY OF THE INVENTION

It is an object of the present invention to fairly allocate bandwidth resources in a radio communications system between mobiles of that system.

According to a first aspect of the invention, there is provided for a radio system a credit bandwidth allocator means for allocating to a plurality of radio connections in a radio system a proportion of an available effective system bandwidth comprising a credit counter means for counting a number of data units received by a radio connection associated therewith one credit counter means being associated with each radio connection, a store for data appertaining to said radio connections, a timer which provides clock signals of a pre-determined duration in accordance with which operation of the said allocator means is controlled and a central controller responsive to data in the store and to the clock signals, for determining in dependence upon the count state of the credit counters and the pre-determined duration of the clock signals a temporal measure of relative performance for said radio connections, thereby to allocate the available effective bandwidth between the said radio connections.

As will be appreciated by those skilled in the art, the invention provides a means for allocating an effective bandwidth of a radio system to a plurality of radio connections competing for that effective bandwidth on a substantially fair basis, and furthermore substantially improves the utilisation of the bandwidth resources available to said radio system.

The credit bandwidth allocator means may operate to adapt the count state of the said credit counters in accordance with the contents of the said data store and the pre-determined duration of the clock pulses.

The said data store of said credit bandwidth allocator means may be a connection information table, containing for a plurality of radio connections within said radio system stored data indicative of a peak data rate for said radio connections, and stored data indicative of a data rate substantially equivalent to an effective bandwidth which said radio connection has been allocated.

The said connection information table of said credit bandwidth allocator means may also contain for said plurality of radio connections within said radio system 'flag' data for indicating whether the radio connections are active.

The credit bandwidth allocator means may form part of a radio system which comprises a plurality of radio connections, connected to at least one base station.

The data units transmitted on the radio connections within the radio system in which the credit bandwidth allocator means may form a part may be ATM cells or parts thereof.

The credit bandwidth allocator means may furthermore form part of a cellular mobile radio system in which there are a plurality of mobiles and a plurality of base stations wherein each mobile has at least one radio connection with at least one base station.

The radio system in which the credit bandwidth allocator means may form a part may support a CDMA radio system.

The radio system in which the credit bandwidth allocator means may form a part may support a TDMA radio system.

According to a second aspect of the invention, there is provided for a radio system having a credit allocator means as aforesaid, a method for allocating an available effective bandwidth of a radio system to radio connections within said radio system, comprising of the following steps:

step 1; simultaneously with all of the following steps, decrementing for each radio connection, a credit counter means operatively associated with that radio connection, for each data unit which is thereby correctly received, step 2; after a predetermined time interval as measured by the said timer means, for each said radio connection that is active, adding to the contents of the credit counter means associated with that active radio connection a number corresponding to the product of the peak data rate for said radio connection and the said time interval, step 3; for all of said radio connections which are active, calculating an effective total system bandwidth demand, as the sum of the peak data rates which appertain to each of said active radio connections, step 4; if the total system bandwidth demand on the radio system as calculated in step 3, is less than a predetermined prescribed total bandwidth, allocating an effective bandwidth to each of the said radio connections corresponding to the said peak data rate appertaining to each of said radio connections, step 5; if in contradistinction the total system bandwidth demand as calculated in step 3, is greater than that available within the said radio system, allocating an effective bandwidth to each of said radio connection corresponding to the number stored in the credit counter associated therewith, divided by the sum of the count state of all credit counters, and multiplied by the total available effective bandwidth, the foregoing steps being continuously repeated during system operation.

The method for allocating an effective bandwidth of a radio system to radio connections within said radio system, may further include a method for initialising the credit counter means associated with a radio connection in relation to said predetermined time interval, where said radio connection has been in-active and is now active, which comprises adding to the count state of said counter means associated with said active radio connection, the product of the difference between the time when said radio connection became active and the time to the end of the predetermined time interval and the peak data rate for said radio connection in data units.

The method for allocating an effective bandwidth of a radio system to radio connections within said radio system, may further include a method for resetting the contents of said credit counter means associated with said radio connection where said radio connection has been active and is now in-active, which comprises setting the count state of the credit counter means associated with said in-active radio connection to zero.

Other objects, advantages and novel features of the present invention will become apparent from the following detailed description of the invention when considered in conjunction with the accompanying drawings.

DETAILED DESCRIPTION OF THE DRAWINGS

In a future mobile radio environment it is expected that voice, video and data connections will be required over the same network. The system described herein relates to data traffic, however the dynamics of call set-ups and clear-downs for voice and video, also affect the available bandwidth resources for data services.

One important problem addressed in this system is that of efficiently and fairly allocating an effective bandwidth of a mobile radio system to mobiles which have bursty data connections.

Figure 1:
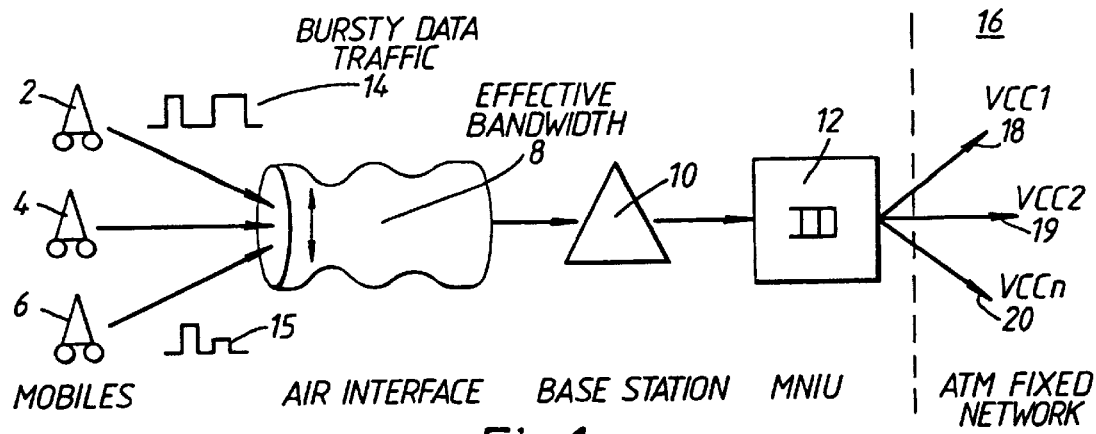
FIG. 1 is a diagrammatic representation of a mobile radio system in which a number of mobiles must share an effective bandwidth.

In a CDMA environment an available bandwidth resource for mobiles supporting data services, varies with time according to an instantaneous noise power level (caused by transmissions from other mobiles in the same cell and surrounding cells) and a number of active voice and video connections. This situation is highlighted in FIG. 1 and is concerned primarily with the upstream (mobile to base station) direction although a similar scheme could be used on the downstream (base station to mobile). In FIG. 1 a number of mobiles of which 2, 4, 6 are examples are shown transmitting over an air interface to a base station 10. Each mobile, in this example, has a data connection which is substantially bursty in nature, as illustrated by the activity distribution with time plot 14, 15. The available bandwidth resource or effective bandwidth changes with time as illustrated by 8. The base station 10 is connected to a Mobile Network Interface Unit (MNIU) 12, via a fixed transmission link (e.g. optical or co-axial cable). The MNIU 12 contains functions which are required to interwork between a mobile network and a fixed network, 16. The fixed network 16, may be broadband in nature as well as supporting Asynchronous Transfer Mode (ATM). The MNIU 12 is therefore illustrated as supporting a number of Virtual Channel Connections (VCC) connections shown as 18, 19, 20, on the fixed network 16.

The requirements of a bandwidth allocation policy for statistical multiplexing bursty data sources, are listed below:

Make efficient use of the available bandwidth.

Be fair to all mobiles (in the long term) by giving the same delay characteristics.

Use a minimal amount of bandwidth for control information.

Each mobile's data source should not be allowed to send at a rate greater than its peak bit rate defined at connection set-up.

The credit bandwidth allocation system is likely to be installed in the MNIU 12, in order to reduce the complexity and cost of the base station 10, although it could reside within a base station.

We are only concerned here with the allocation of bandwidth to connections which have been set-up and accepted by a Connection Admission Control (CAC) function. As part of a connection set-up procedure within a CAC, a peak bit rate for a connection between a mobile and a base station is declared via signalling procedures and is therefore known to the credit bandwidth allocation system. Furthermore, it is assumed that there are two signalling mechanisms available, one for upstream signalling and one for downstream signalling.

The upstream signalling makes use of a random access signalling channel. An example of how this channel is used to initiate data transfer after a period of inactivity is illustrated by the event chart shown in FIG. 2. The random access signalling channel has one CDMA code known by all mobiles in one cell (per carrier). A mobile that needs to signal the MNIU sends a message on the random access channel 34 and sets a timer going to detect collisions on the random access channel 46. If the MNIU responds, by sending the message "who are you and respond on code X" 36, before the timer expires 46, then the mobile knows that the message has got through. However, if the timer expires 46 before the reply is received the message is sent again.

When the mobile has received a channel allocation (CDMA code X) it responds on this code saying "I am mobile Y" 38 and sets another timer 48 to detect multiple responders. The MNIU 32 then sends a message (on the broadcast signalling channel) saying "mobile Y, go/no go, send data on the following codes" 40. The mobile Y 30 may now send data 42 and the code (or codes) implies a specified bit rate.

The reason that a second timer is required is that two mobiles may have responded saying "I am Y" and "I am Z", at 38. The MNIU 32 may hear neither, one or both of these messages. The MNIU decides to which mobile it should reply and sends the go/no go message explicitly to one of them. The other mobile's timer will expire, and after a back-off period will try again.

Figure 3:
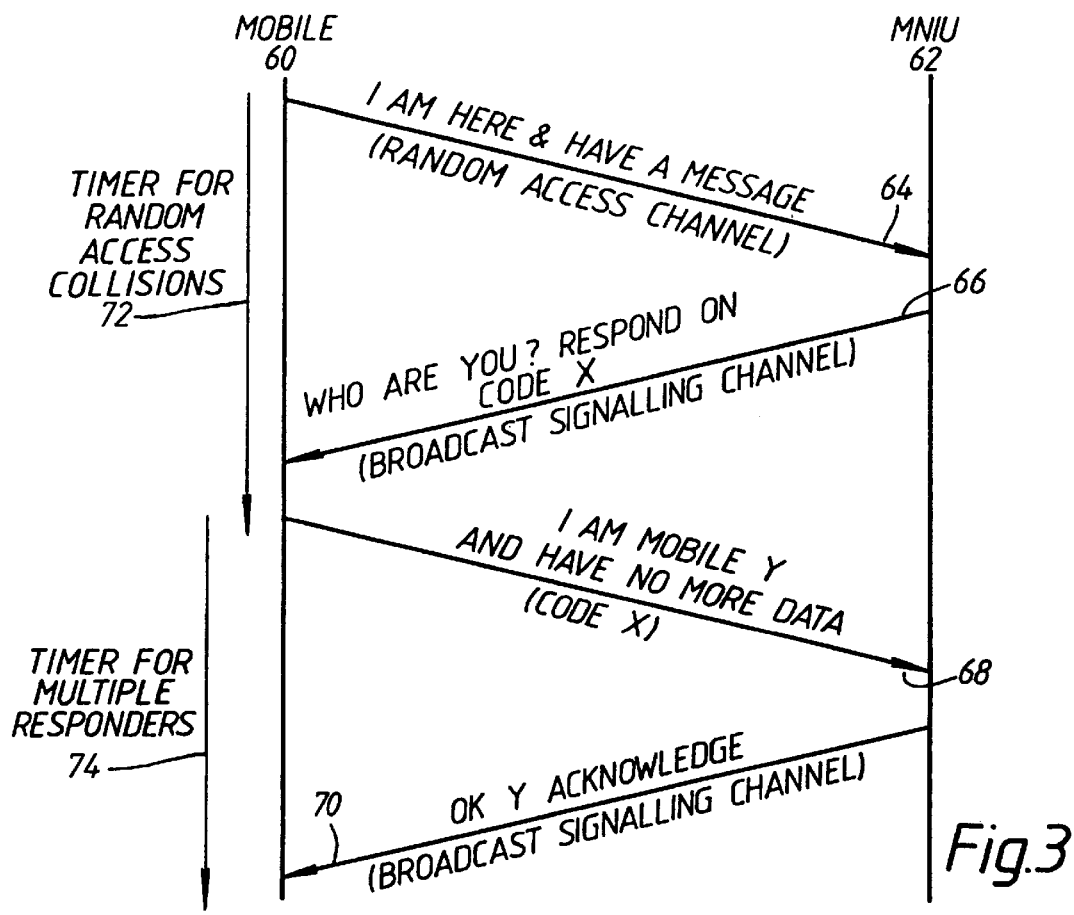
FIG. 3 is an event diagram for a random access of a mobile releasing resource.

The message flow in the case of a mobile signalling the MNIU that it has no more data to send is very similar to the situation where it has data to send. This is illustrated in FIG. 3. In FIG. 3, a mobile 60, alerts an MNIU 62 to its presence by signalling "I am here & have a message" 64, on the random access channel. The MNIU 62 responds on a broadcast channel with "who are you? respond on code x" 66. The mobile 60 will respond with "I am mobile Y and have no more data to send" 68. The MNIU 62 responds with a message "OK Y, acknowledge" 70. During each message sequence sent by the mobile Y 60 on the upstream random access channel, the mobile Y 60 starts a timer 72 and 74 so as to detect whether or not its random access has been successful.

It should be noted that the "no more data to send" message as effected by the message event sequence illustrated by FIG. 3, could be sent at the end of the data burst on the data channel. However, this option would require the MNIU to intercept this message and would require some extra procedures to provide reliable message transfer, in case of loss or corruption.

In the downstream direction a broadcast signalling channel is used. This is one CDMA code known by all the mobiles in the cell (per carrier) which can therefore be "heard" by all the mobiles. The process by which the MNIU signals a change in the transmission rate of a mobile, effecting a change in allocation of the system effective bandwidth is illustrated by the message sequence chart of FIG. 4.

Figure 4:
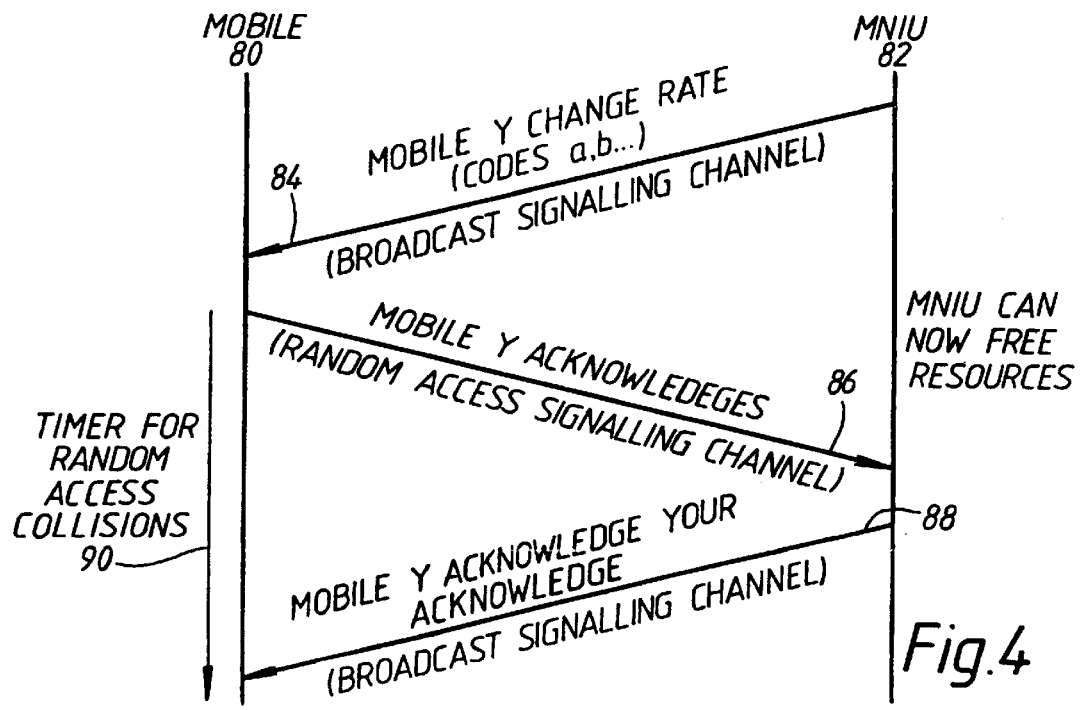
FIG. 4 is an event diagram for an upstream change of rate.

In FIG. 4, an MNIU 82, signals a mobile 80 to change its (upstream) transmission rate by way of a message 84 telling the mobile 80 to "change rate to codes a, b, . . . ". The mobile responds on the random access channel with an acknowledge 86 and sets the timer going 90. The MNIU 82 can now release the resources (CDMA codes and corresponding bandwidth) and then has to acknowledge the mobile's acknowledgement 88, due to a possibility of collision on the random access signalling channel.

Figure 2:
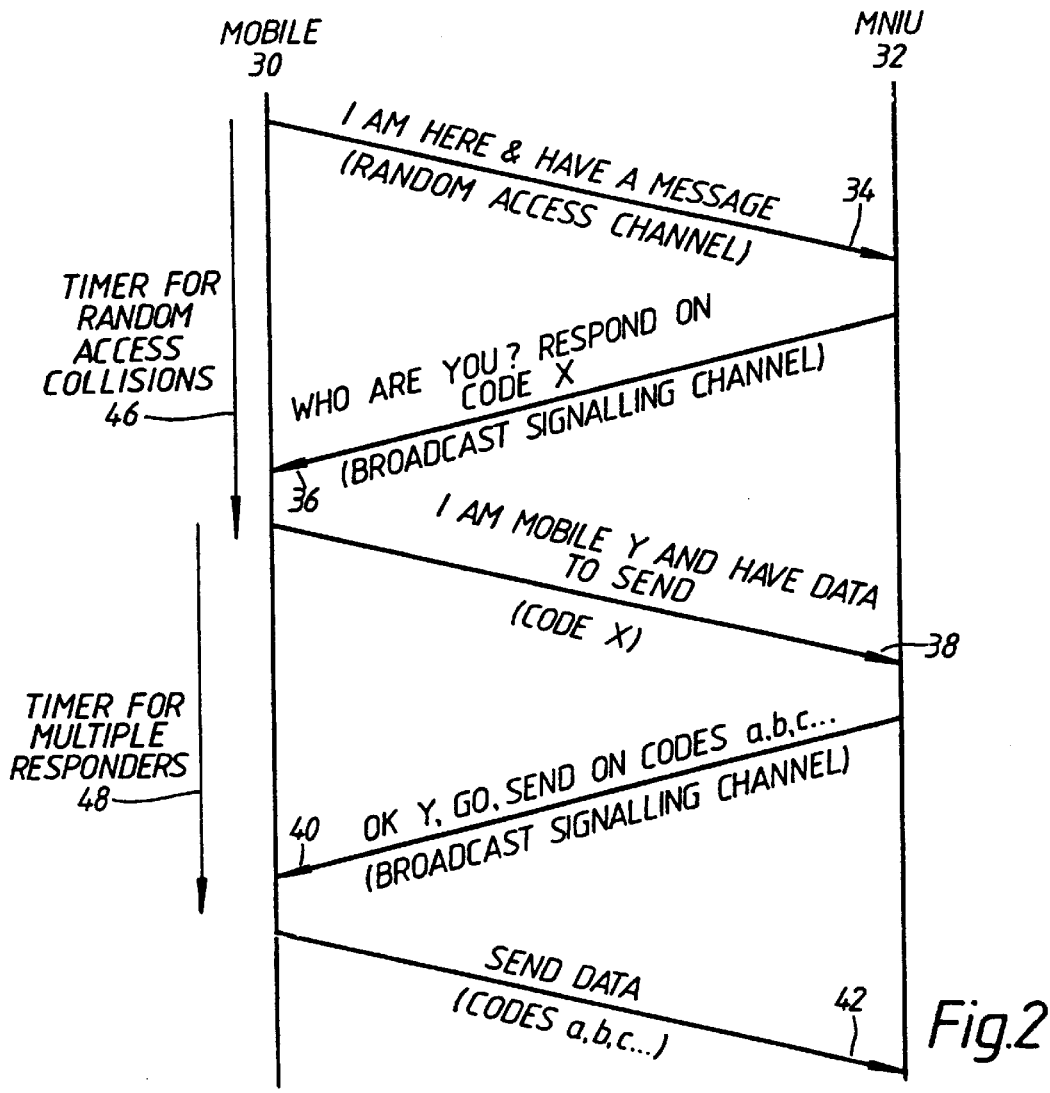
FIG. 2 is an event diagram for a random access sequence for a mobile.

In summary at this point, the CDMA mobile radio system incorporates a technique for signalling on the upstream and on the downstream, as illustrated by FIGS. 2, 3 and 4 and described above. These up- and down-stream signalling channels provide the facility for firstly signalling that a mobile has a requirement to transmit data, secondly for a mobile to inform an MNIU that it has no more data to send, and thirdly the facility for an MNIU to inform a mobile of a change in its allocated resource, through a change in its allocated codes.

Figure 5:
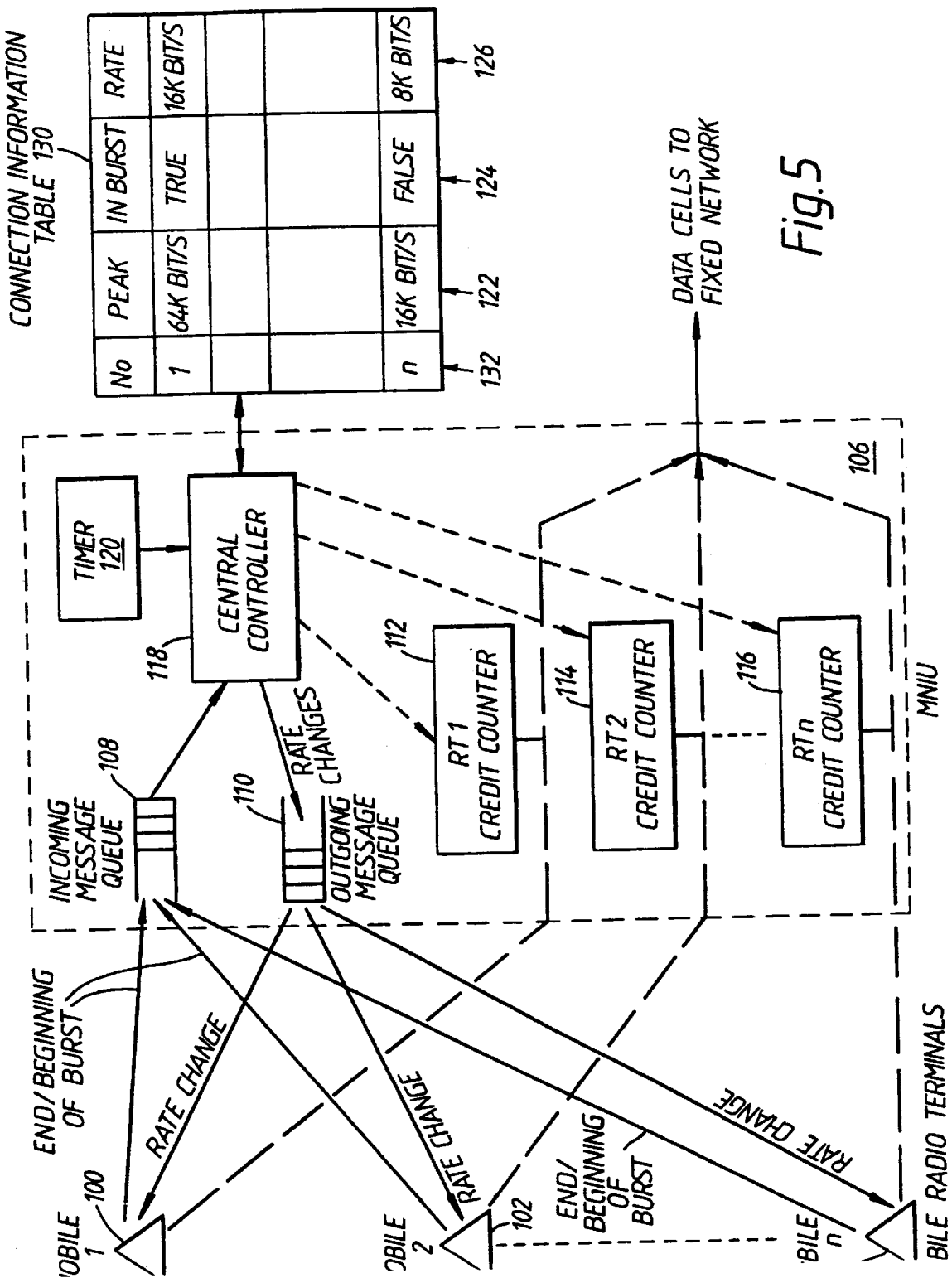
FIG. 5 is a diagrammatic representation of a credit bandwidth allocation apparatus.
Figure 10:
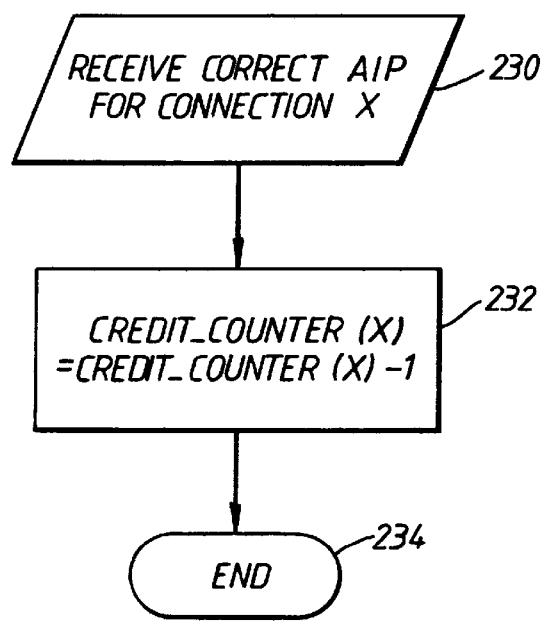
FIG. 10 is a flow diagram illustrating a process for decrementing the credit counter of a mobile connection.

The credit bandwidth allocation system will now be described, with reference to the diagram of FIG. 5, and the flow diagrams of FIGS. 6, to 10. FIG. 5 shows one embodiment of the credit bandwidth allocation apparatus as illustrated as being contained within an MNIU 106. This comprises an incoming message queue 108, for all messages received from mobiles within the system on the up-stream, and an outgoing message queue 110, for all messages from the MNIU to the mobiles in the system on the down-stream. The messages from the incoming message queue 108 are fed into a central controller 118, which is also stimulated by a timer 120. The central controller 118 also has access to a credit counter for each connection between a mobile and a base station, as illustrated by way of example by the credit counters 112, 114, 116, for the connections to the mobiles 100, 102, 104 respectively. The central controller 118 also has access to a connection information table 130, which contains row entries for each mobile connected to the MNIU, and column entries comprising of at least a connection number 132, a peak bit rate registered for that connection 122, a flag indicating whether that connection is active (in-burst) 124, and an entry for the current bit rate allocated to that connection 126, as determined by the effective bandwidth of the system allocated to that connection.

Messages from the central controller 118 to be sent to the mobiles on the downstream broadcast channel are fed into the outgoing message queue 110.

In operation the central controller 118 controls the allocation of the effective bandwidth of the system to the mobiles, according to the process to be described shortly. It is assumed that each mobile informs the MNIU of the beginning of a data burst (data to send) and the end of a data burst (no data to send) via the relevant signalling mechanisms already described above. These messages are received and stored on the incoming message queue 108, ready to be processed by the central controller 118. The MNIU 106 holds a credit counter 112, 114, 116 for each data connection that is currently active, and which contains the outstanding credits for that connection.

Data is sent over the air interface between a mobile and a base station in fixed size packets called Air Interface Packets (AIPs), the size of which is determined by the format of the radio interface of the system. A credit is defined as being an AIP that has been correctly received.

Every time an AIP is correctly received at the MNIU the corresponding credit counter 112, 114, 116 is decremented. This process is illustrated by the flow diagram in FIG. 10. After every pre-determined time interval or update interval T_update as determined by pulses generated by the timer 120, (T_update is a system parameter) the credit counter associated with each active connection is updated by the central controller 118, by adding the expected number of credits that would have been received during T_update if the peak bit rate had been allocated to the mobile connection (peak bit rate multiplied by T_update) and all AIPs had been received error free.

Also at every update period the credit controller 118 adjusts the bandwidth allocated to a connection, based on the number of outstanding credits and the peak bit rate, and generates rate change messages which are put in the outgoing message queue 110. The outgoing message queue 110 transmits these messages to the mobile as previously described.

Figure 8:
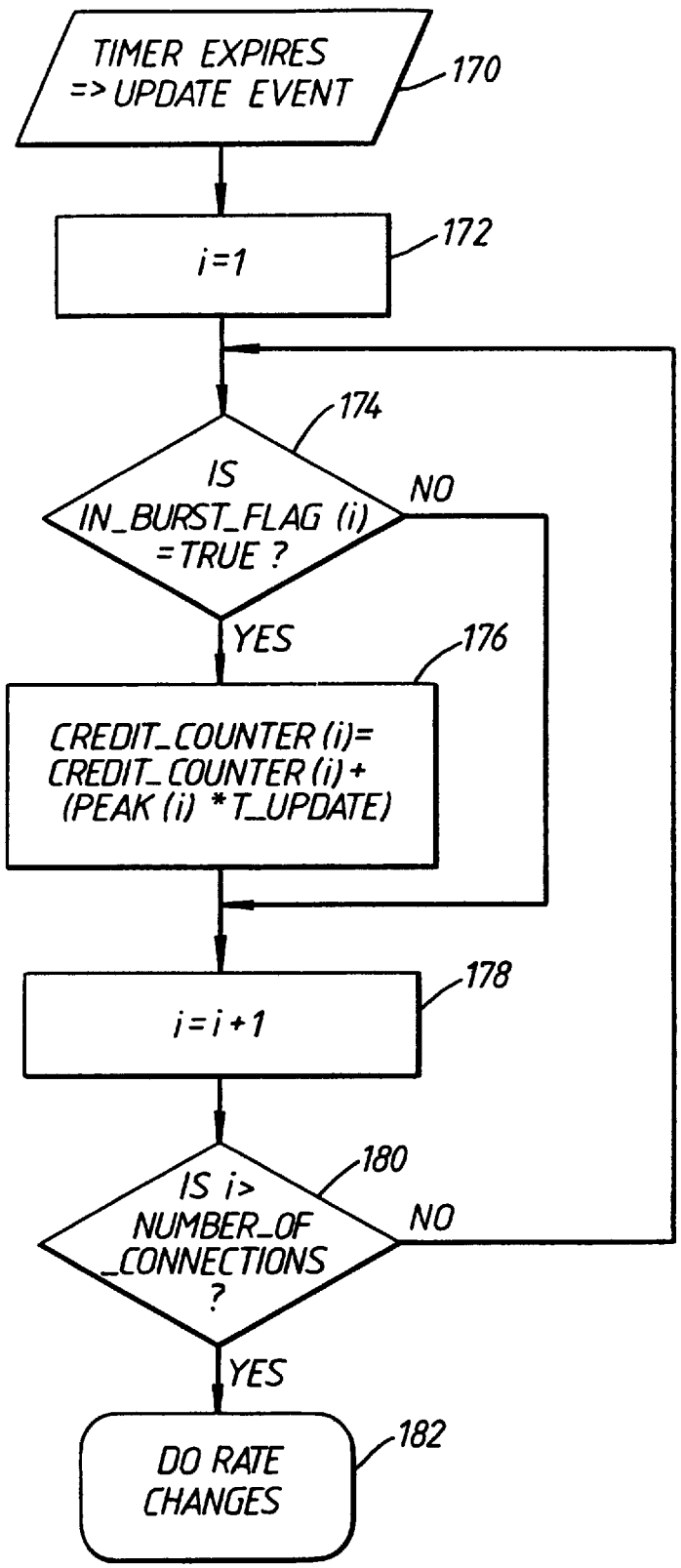
FIG. 8 is a flow diagram illustrating a process for updating the credit counters.

The process by which the credit counters are updated is illustrated by the events depicted by the flow chart given in FIG. 8. Starting with event 170, where the timer 120 expires after a period of T_update, the central controller 118 initialises a variable i, that represents the mobile connection number to be up-dated, so that i=1 for the first connection, 172. By examination of the corresponding entry in the column 124 of the connection information table 130, the activity flag is tested to see whether the mobile connection i is active, 174. If no then increment i, 178 and test to see that i was the last connection, 180. If yes at 174, then the central controller 118 proceeds to step 176, where the credit counter is up-dated by adding to it the result of multiplying the peak bit rate in AIPs for connection i (corresponding entry of column 122 of the connection information table 130) by the up-date period T_update. Then proceed to step 178 where the connection number i is incremented, and then to step 180, to determine whether that was the last connection. If the answer is yes at 180 then proceed to step 182 and do the rate changes. Otherwise go to 174.

Figure 9:
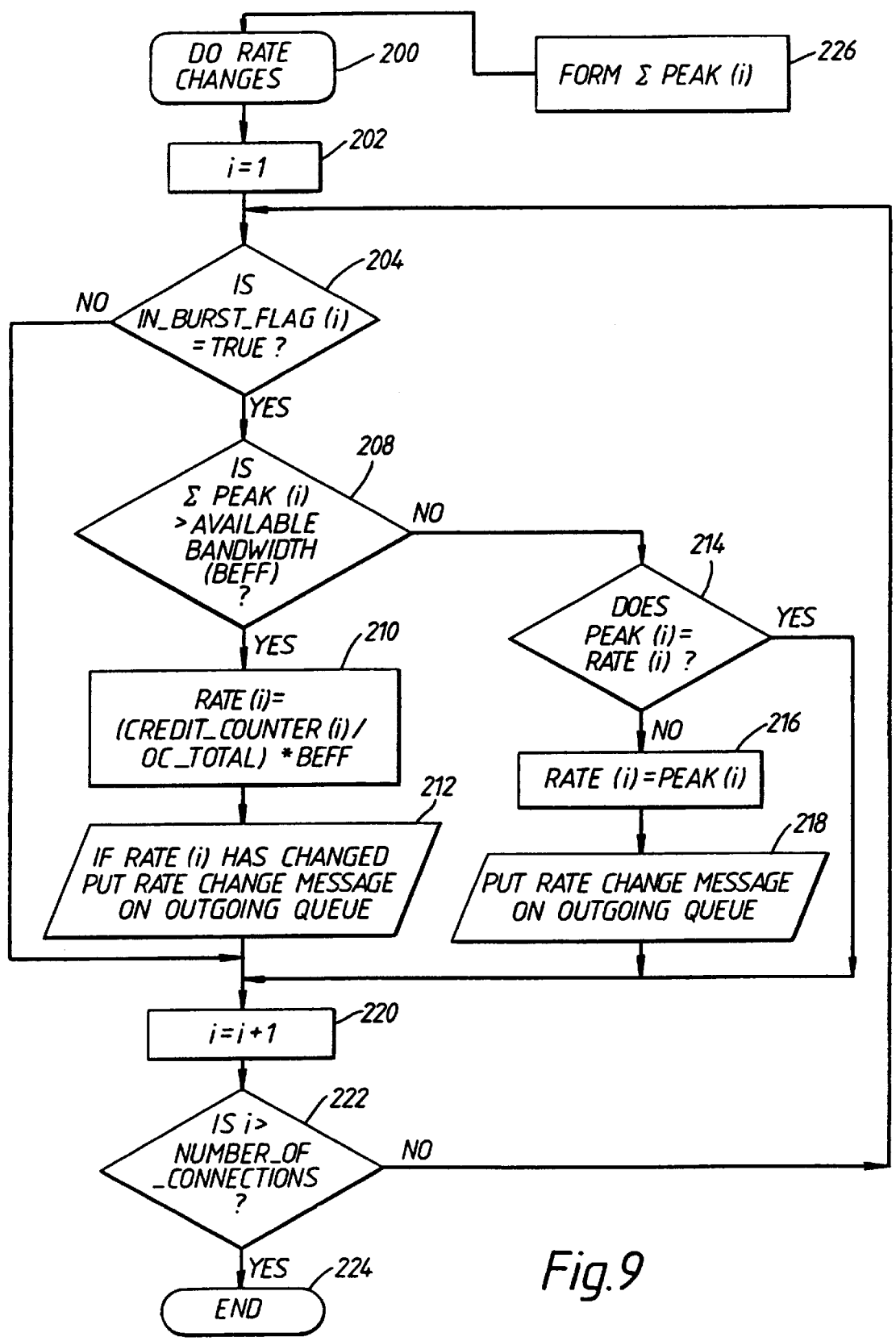
FIG. 9 is a flow diagram illustrating a process for changing the bandwidth allocation of mobiles.

The process by which the bandwidth is allocated to a mobile connection for the next T_update period is illustrated by a flow diagram in FIG. 9, and described as follows. Let $OC_i$ be the number of outstanding credits for a mobile connection i, $Peak_i$ be the peak bit rate specified for connection i, $OC_{total}$ be the total number of outstanding credits at T_update and N be the total number of connections. Also let $B_{eff}$ be the effective bandwidth available for data traffic at the time of the update.

At the expiry of the timer 120 at T_update, find the total demand on the system by summing the peak bit rate requirements for all active connections, 226 then do the rate change from 200. For each mobile connection from i=1 (node 202) to N (node 222), check the flag to determine whether the mobile connection is active, 204. If no at 204, then go to the next connection determined by 220. If yes at 204, then test to see whether the total demand on the system calculated at step 226, exceeds the total effective bandwidth within the system, 208. If no at 208, then check whether the peak bit rate for the mobile connection i, Peak(i), is equal to the bit rate allocated to that connection, as determined by the allocated bandwidth, 214. If no at 214, then allocate the bandwidth to provide the mobile connection i with its peak bit rate Peak(i), 216 and signal this to the mobile by putting a rate change signal on to the queue, 218, then proceed to the next mobile connection determined by 220. Otherwise if the test at 214 was true then go to the next mobile connection determined at 220.

If the total demand on the system is less than the effective bandwidth of the system, as tested at 208, or in other words; If $$\sum_{i=1}^{N} Peak_i \le B_{eff}$$

(step 208) then allocate $Peak_i$ to connection i, (step 214)
else
allocate $$\left\lfloor \frac{OC_i}{OC_{total}} * B_{eff} \right\rfloor$$

to connection i ($rate_i$), step 212. Where $\lfloor X \rfloor$ is the largest integer number of basic channels <=X.

If there is still some capacity left, it can be allocated first to active connections with zero bandwidth and then to the lower peak bit rate connections as the rounding error will be proportionally worse for lower peak bit rate connections.

At step 212, the appropriate rate change is signalled to the mobile, by putting an appropriate message in the outgoing queue. The next mobile connection i to be processed, is then determined at step 220. At step 222, test if all mobile connections have been processed. If no, then go to 204, if yes then end at 224.

Where, for example, the mobile connections are transmitting Asynchronous Transfer Mode (ATM) cells, this scheme should maintain a service rate of at least the Sustainable Cell Rate (SCR), as defined by the ATM Forum. This is achieved by the credit bandwidth allocation system, since it approximates a global FIFO policy for each mobile connection over a number of update intervals, provided that the sources obey their traffic contract. In the long term, the credit bandwidth allocation scheme provides a fair allocation of bandwidth to competing sources. On a shorter time-scale there will be some measure of unfairness.

Figure 6:
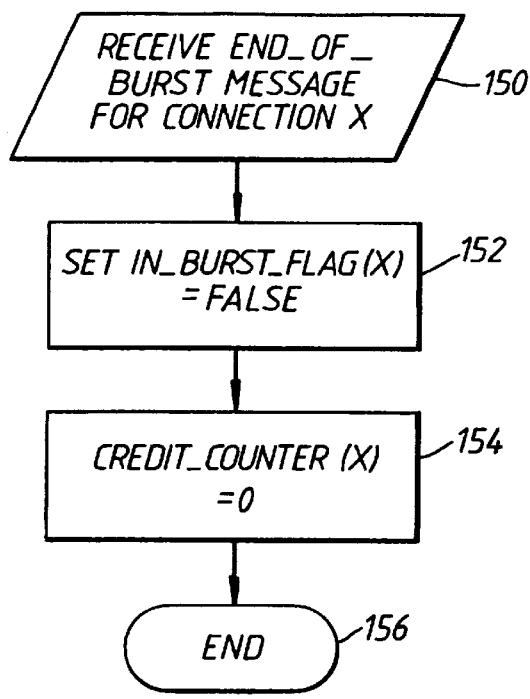
FIG. 6 is a flow diagram illustrating the events following the reception of an 'end of burst' message.

When a mobile radio terminal signals, the end of a burst, the steps taken are illustrated by a flow diagram given in FIG. 6. When the central controller 118 receives an 'end of burst' message for a connection x, 150, it sets the corresponding active flag false 152. It then proceeds to 154 where it resets the corresponding credit counter to zero. The process terminates at step 156.

Figure 7:
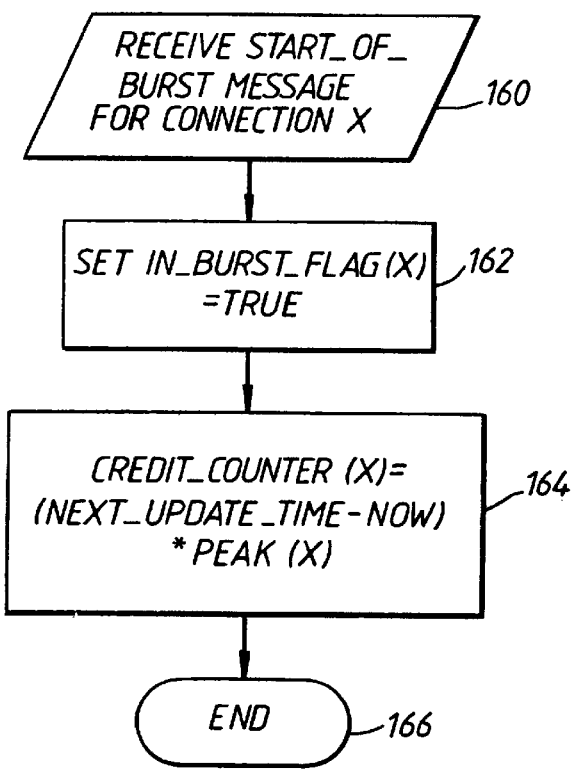
FIG. 7 is a flow diagram illustrating the events following the reception of a 'start of burst' message.

When a mobile signals the beginning of a burst, the associated activity flag 124 is set to true and the associated credit counter will be loaded with an appropriate value based on the time to the next update, and the peak bit rate. This part of the process is illustrated by a flow diagram shown in FIG. 7. When the central controller 118 receives a 'start of burst' message for a connection x 160, it proceeds to set the corresponding activity flag to true 162, in the corresponding column entry 124 in the connection table 130. The corresponding credit counter is then set to a value at 164, which is equal to the time remaining to the next update period multiplied by the peak bit rate in AIPs for the connection x. This process is concluded at step 166 of the flow diagram. Only at the next update period will the rate change messages be broadcast to the mobile radio terminals.

The proposed scheme will be able to make more efficient use of the available bandwidth resources of a radio system for bursty data connections than traditional peak bit rate allocation schemes. Fairness is ensured both in terms of the delay suffered and the proportion of the available bandwidth resources allocated to each source. The complexity is relatively small with a minimum of extra control traffic (flow control messages).

Although the embodiment of the credit bandwidth allocator has been illustrated by way of an example to a CDMA mobile radio system, it can equally be used with a TDMA mobile radio system, or equally any radio system, where the radio resource must be shared between multiple mobiles who are communicating in quantifiable units of data which can be buffered and transmitted after tolerating some delay.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What I claim is:

1. Apparatus for allocating a proportion of an available effective system bandwidth to a plurality of radio connections in a radio system, the apparatus comprising:

a plurality of credit counter means for counting a number of data units received by a plurality of radio connections associated therewith, each credit counter means being associated with a respective one of said radio connections;

storage means for storing data appertaining to said radio connections;

timer means for providing clock signals of a pre-determined duration in accordance with which operation of said apparatus is controlled; and controller means responsive to data in said storage means and to said clock signals for determining a temporal measure of relative performance for said radio connections in dependence upon the count state of said credit counters and said pre-determined duration of said clock signals;

wherein the controller means comprises determining means for determining if said effective total system bandwidth exceeds a pre-determined proscribed total bandwidth for said radio system; and allocating means for allocating an effective bandwidth to each of said radio connections in accordance with determination provided by the determining means; said effective available bandwidth being allocated to each radio connection corresponding to peak data rate appertaining to each of said radio connections if said total system bandwidth demand on said radio system is less than said pre-determined prescribed total bandwidth, and to the number stored in said credit counter means associated therewith divided by the sum of the count state of all credit counter means multiplied by said total available effective bandwidth if said total system bandwidth demand is greater than said pre-determined proscribed total bandwidth.

2. Apparatus according to claim 1, wherein said controller means further comprises operating means for adapting the count state of said credit counters in accordance with the contents of said storage means and the pre-determined duration of said clock pulses to facilitate the determination of said temporal measure of performance for said radio connections.

3. Apparatus according to claim 1, wherein said storage means comprises a connection information table which contains stored data indicative of a peak data rate for each of said radio connections and stored data indicative of a data rate substantially equivalent to an effective bandwidth which has been allocated to each of said radio connections.

4. Apparatus according to claim 3, wherein the connection information table contains 'flag' data for each of said radio connections within said radio system which indicates whether that radio connection is active.

5. A radio system comprising a plurality of radio connections, at least one base station, and apparatus according to claim 1, wherein said apparatus is used to connect said radio connections to said base station for data transmission.

6. A radio system according to claim 5, wherein said data units transmitted on said radio connections within said radio system comprise ATM cells or parts thereof.

7. A radio system according to claim 5 comprising a cellular mobile radio system wherein said radio connections comprise mobile units which communicate via apparatus with one or more base stations.

8. A radio system according to claim 5 comprising a CDMA radio system.

9. A radio system according to claim 5 comprising a TDMA radio system.

10. A method for allocating an available effective bandwidth of a radio system to radio connections within said radio system, each of said radio connections having a credit counter operatively associated therewith, the method comprising carrying out the following steps simultaneously:

1) decrementing a credit counter means operatively associated with each radio connection for each data unit which is correctly received thereby;

2) after a predetermined time interval, adding the contents of the credit counter means associated with each radio connection which is active to a number corresponding to the product of the peak data rate for said radio connection and said time interval;

3) calculating an effective total system bandwidth demand for all active radio connections as the sum of the peak data rates which appertain to each of said active radio connections;

4) determining if said effective total system bandwidth exceeds a pre-determined proscribed total bandwidth for said radio system;

5) allocating an effective bandwidth to each of said radio connections corresponding to said peak data rate appertaining to each of said radio connections if said total system bandwidth demand on said radio system is less than said pre-determined proscribed total bandwidth;

6) allocating an effective bandwidth to each of said radio connections corresponding to the number stored in said credit counter means associated therewith divided by the sum of the count state of all credit counter means multiplied by said total available effective bandwidth if said total system bandwidth demand is greater than said pre-determined prescribed total bandwidth; and 7) continuously repeating steps 1) to 6) during operation of said radio system.

11. A method according to claim 10, further including the step of initializing the credit counter means associated with a radio connection in relation to said pre-determined time interval when said radio connection becomes active, said step of initializing the credit counter means comprising adding the product of the difference between the time when radio connection became active and the time to the end of the pre-determined time interval and the peak data rate for said radio connection in data units to the count state of said counter means associated with said active radio connection.

12. A method according to claim 11, further comprising the step of resetting the contents of said credit counter means associated with said radio connection to zero when said radio connection becomes inactive.

* * * * *